(12) United States Patent
Collins

(10) Patent No.: US 7,788,814 B2
(45) Date of Patent: Sep. 7, 2010

(54) MACHINE ALIGNMENT SYSTEM

(75) Inventor: Kevin L. Collins, Mansfield, TX (US)

(73) Assignee: United Technologies Corporation, Hartford, CT (US)

( * ) Notice: Subject to any disclaimer, the term of this patent is extended or adjusted under 35 U.S.C. 154(b) by 282 days.

(21) Appl. No.: 11/960,882

(22) Filed: Dec. 20, 2007

(65) Prior Publication Data

US 2009/0162156 A1 Jun. 25, 2009

(51) Int. Cl.
*G01C 15/00* (2006.01)
*G01D 21/00* (2006.01)

(52) U.S. Cl. ............. 33/286; 33/613; 33/DIG. 21

(58) Field of Classification Search ............ 33/1 BB, 33/201, 286, 502, 506, 516, 613, 626, 627, 33/638, 641, 642, 645, 655, 677, 549, 567, 33/573, DIG. 21, 227, 228, 293; 408/13, 408/16

See application file for complete search history.

(56) References Cited

U.S. PATENT DOCUMENTS

| | | | |
|---|---|---|---|
| 3,723,013 A * | 3/1973 | Stirland et al. | 356/152.1 |
| 5,148,232 A * | 9/1992 | Duey et al. | 356/141.3 |
| 6,094,793 A | 8/2000 | Szuba | |
| 6,175,413 B1 * | 1/2001 | Lucas | 356/614 |
| 6,177,038 B1 | 1/2001 | Reed et al. | |
| 6,224,361 B1 | 5/2001 | Reed et al. | |
| 6,238,187 B1 | 5/2001 | Dulaney et al. | |
| 6,593,541 B1 | 7/2003 | Herren | |
| 6,763,281 B2 | 7/2004 | Schauer et al. | |
| 6,815,637 B2 | 11/2004 | Bell et al. | |
| 7,002,100 B2 | 2/2006 | Wu et al. | |
| 7,109,436 B2 | 9/2006 | Even et al. | |
| 7,140,118 B2 * | 11/2006 | Adrian | 33/286 |
| 7,158,857 B2 | 1/2007 | Schauer et al. | |
| 7,207,869 B2 | 4/2007 | James | |
| 7,257,879 B1 | 8/2007 | Jansco | |
| 7,464,478 B2 * | 12/2008 | Adrian | 33/286 |

* cited by examiner

*Primary Examiner*—Amy Cohen Johnson
(74) *Attorney, Agent, or Firm*—Carlson, Gaskey & Olds, P.C.

(57) ABSTRACT

A machine alignment system is disclosed that includes a support member. A workpiece is supported by the support member during a machine operation. A robot includes a tool that is spaced from the support member. A laser is associated with the tool and is configured to provide a laser beam. An alignment tool is arranged on the support member. The laser and alignment tool cooperate to ensure alignment of the tool relative to the workpiece. The alignment tool includes an aperture. An adjustment member is associated with one of the tool and the support member. The adjustment member is configured to adjust a relative position between the tool and the support member to enable the laser beam to pass through the aperture and onto a target surface during an alignment procedure.

8 Claims, 2 Drawing Sheets

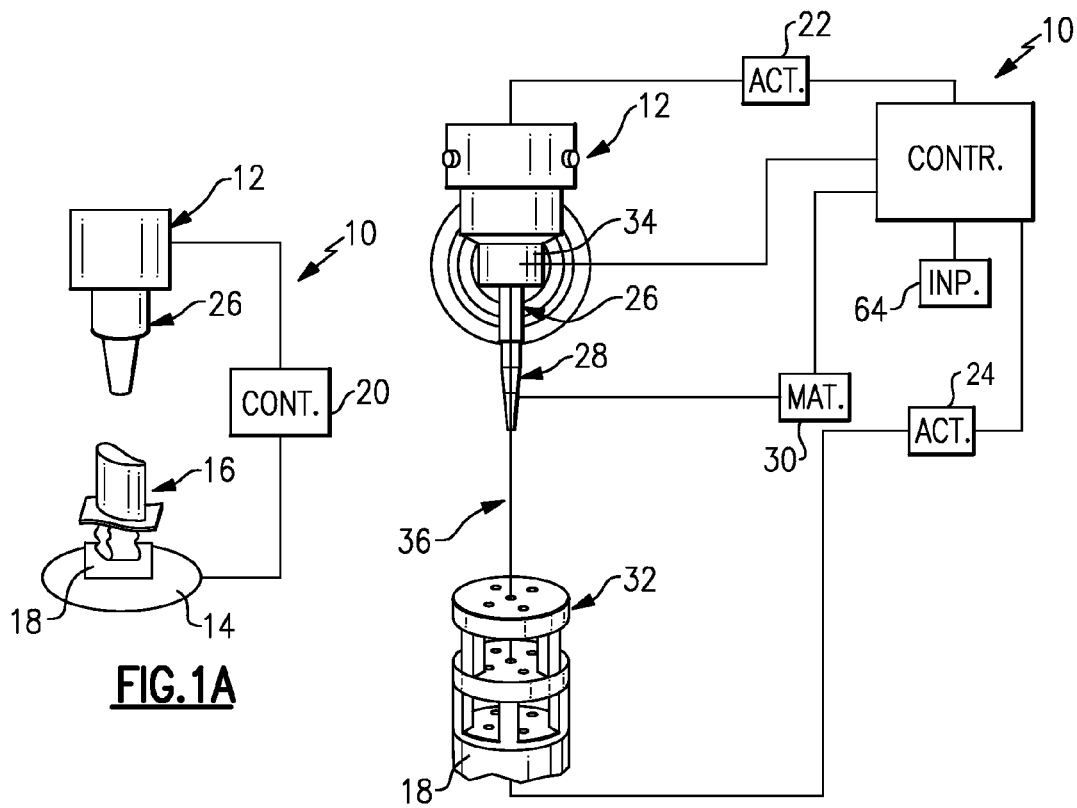
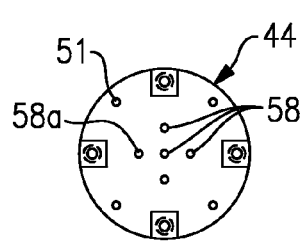
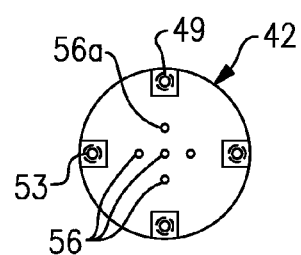
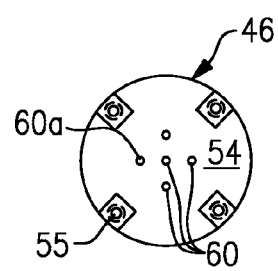

MACHINE ALIGNMENT SYSTEM

BACKGROUND

This disclosure relates to an alignment system for a machine. More particularly, the disclosure relates to an alignment tool for aligning a machine relative to a workpiece.

Robots are widely used in industry for a variety of purposes. It is desirable to increase the use of robots in the aerospace industry, in particular, for very difficult and labor intensive tasks. However, for some tasks in particular, the application of robots is limited by the accuracy of the robot's alignment with a workpiece. For example, a typical alignment specification is a +/−2 degree orientation of the robot end effector relative to the workpiece.

It is desirable to use robots, for example, to shot peen or grit blast parts such as turbine blades, for example. For one example shot peening process, a typical distance for which the robot's end effector would need to traverse the workpiece, the +/−2 degree alignment would result in the end effector drifting off of the workpiece. Accordingly, each workpiece would need to be inspected to identify potential locations that were missed, requiring the workpiece to be manually reworked.

What is needed is a system and method of ensuring robot alignment relative to the workpiece that is sufficient to maintain desired orientation of the end effector and its tool relative to the workpiece.

SUMMARY

A machine alignment system is disclosed that includes a support member. A workpiece is supported by the support member during a machine operation. A robot includes a tool that is spaced from the support member.

A laser is associated with the tool and is configured to provide a laser beam. An alignment tool is arranged on the support member. The laser and alignment tool cooperate to ensure alignment of the tool relative to the workpiece. The alignment tool includes an aperture. An adjustment member is associated with one of the tool and the support member. The adjustment member is configured to adjust a relative position between the tool and the support member to enable the laser beam to pass through the aperture and onto a target surface during an alignment procedure. In one example, the target surface is provided by the alignment tool.

These and other features of the disclosure can be best understood from the following specification and drawings, the following of which is a brief description.

BRIEF DESCRIPTION OF THE DRAWINGS

FIGS. 1A and 1B are highly schematic views of a machine for use with a workpiece and an alignment tool.

FIGS. 4A-4C are top elevational views of second, first and third plates, respectively, of the alignment tool.

DETAILED DESCRIPTION

Figure 2:
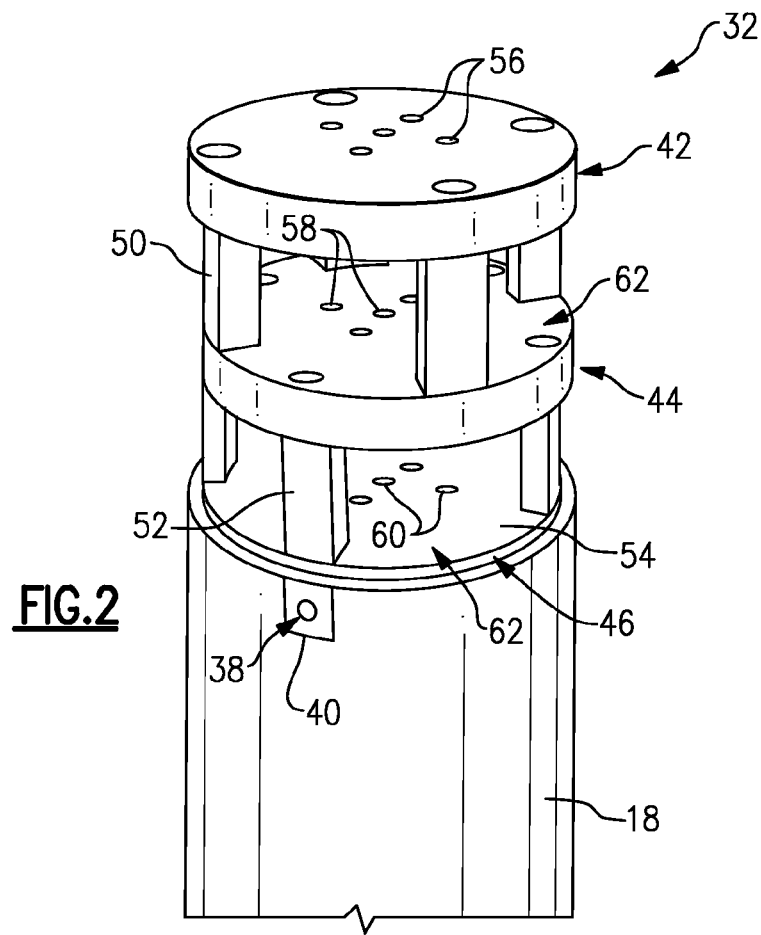
FIG. 2 is a perspective view of the alignment tool supported in a fixture.

A machine 10 is shown in FIGS. 1A and 1B for performing operations on a workpiece 16. In one example, the workpiece 16 is an aerospace component such as a turbine airfoil. The machine 10 includes a robot 12 having an end effector 26 that carries a tool 28. In one example, the robot 12 is a six-axis machine. The tool 28 is used to provide a plasma spray, shot peen, grit blast or weld, for example, by depositing material 30 onto the workpiece 16, for example. In one example, the workpiece 16 is mounted on a fixture 18 that is supported on a platter 14, which is rotatable about an axis.

It is desirable to provide at least a predetermined amount of alignment accuracy between the tool 28 and the workpiece 16. To this end, the example machine 10 includes an alignment system for aligning the tool 28 and fixture 18 periodically. However, it should be understood that other components of the machine than those described can be aligned with one another to ensure alignment between the tool 28 and workpiece 16.

Figure 3:
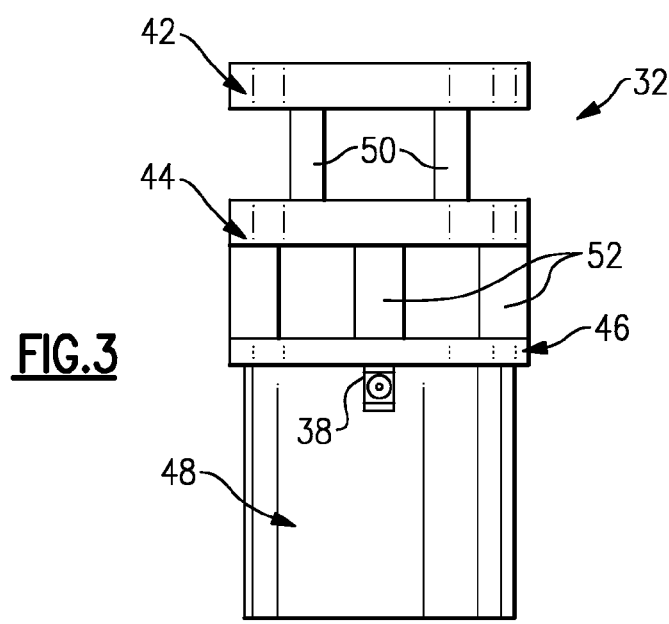
FIG. 3 is a side elevational view of the alignment tool.

Referring to FIGS. 2 and 3, an example alignment tool 32 is shown supported by the fixture 18. In one example, the fixture 18 is generally cylindrical in shape. The alignment tool 32 includes a body 48 that is received within the fixture 18, in one example. The alignment tool 32 includes a key 38 that is received by a complimentarily shaped notch 40 in the fixture 18 to repeatably position the alignment tool 32 as desired.

Returning to FIG. 1B, a laser 34 is provided on the end effector 26 in any suitable manner and positioned relative to the tool 28, for example, parallel with the direction of material deposition from the tool 28. A beam 36 from the laser 34, which is 0.125 in (3.25 mm) in one example, is directed at the alignment tool 32. In one example, the alignment tool 32 acts a go/no-go gauge. The beam 36 is directed through apertures 56, 58 (FIG. 2) in the alignment tool 32. The apertures 56, 58 are 0.125 in (3.25 mm) in one example. If the beam 36 shines on a target surface 54 (FIG. 2) of the alignment tool 32, then the desired alignment and orientation between the tool 28 and fixture 18 has been achieved. If the beam 36 does not shine on the target surface 54 or is partially obstructed or distorted, the position of the end effector 26 is adjusted in response to inputs 64. For example, an input 64 is provided to the controller 20, which commands actuators 22, 24, to obtain a desired orientation between the tool 28 and fixture 18 via the laser 34 and alignment tool 32.

Referring to FIGS. 3 and 4A-4C, the alignment tool 32 includes first, second and third plates 42, 44, 46 that are separated from one another at a desired spacing using first and second sets of risers 50, 52. Holes 49 and 51 respectively provided in the first and second plates 42, 44 and are aligned with one another. The first set of risers 50 are arranged between the holes 49, 51 and fasteners (not shown) are received by the holes 49, 51 and first set of risers 50 to secure the first and second plates 42, 44 to one another. Similarly, holes 53, 55 in the second and third plates 44, 46 are aligned with one another. The second set of risers 52 are arranged between the holes 53, 55. Fasteners (not shown) are received by the holes 53, 55 and second set of risers 52 to secure the second and third plates 44, 46 to one another.

The first and second plates 42, 44 respectively include multiple first and second apertures 56, 58. The third plate 46 includes the target surface 54 having a corresponding number of dimples 60 arranged beneath the second apertures 58. The first and second apertures 56, 58 and the dimples 60 are precisely aligned with one another. During an alignment procedure, the laser 34 directs the beam 36 through one vertical set of apertures 56a, 58a (FIGS. 4A-4C) in an attempt to shine the beam 36 onto the dimple 60a. The target surface 54 and beam 36 is viewed through openings 62 provided between the plates 42, 44, 46 and first and second sets of risers 50, 52. If the tool 28 is not aligned with the fixture 18 as desired, the beam 36 will be undesirably blocked by at least one of the first and second plates 42, 44 thus preventing the beam 36 from shining onto the dimple 60. If the beam 36 is blocked from shining on the desired dimple 60, then a user provides inputs 64 to the controller 20 to adjust the relative position of the tool 28 and fixture 18.

Once desired alignment has been achieved, the alignment tool 32 can be removed from the fixture 18. The workpiece 16 is then mounted onto the fixture 18. The path of the tool 28 will not drift from the workpiece 16 during the machine process due to an undesired misalignment.

Although an example embodiment has been disclosed, a worker of ordinary skill in this art would recognize that certain modifications would come within the scope of the claims. For that reason, the following claims should be studied to determine their true scope and content.

What is claimed is:

1. A method of aligning a machine comprising the steps of:
providing a tool and a target;
arranging an alignment tool with a plurality of apertures between the tool and the target, wherein the alignment tool includes multiple plates spaced from one another, each of the plates including an aperture of the plurality of apertures, the apertures aligned with one another, the multiple plates supported on a common fixture;
directing a laser beam between the tool and the target; and
aligning the tool and target to ensure that the laser beam passes through the aligned apertures in multiple plates and onto one of the tool and target.

2. The method according to claim 1, wherein the arranging step includes providing the target on the alignment tool.

3. The method according to claim 1, wherein the directing step includes supporting a laser near a tool and directing it toward the fixture.

4. The method according to claim 1, comprising the step of removing the alignment tool from the fixture and mounting a workpiece onto the fixture.

5. A machine alignment system comprising:
a support member;
a tool spaced from the support member;
a laser associated with the tool and configured to provide a laser beam;
an alignment tool arranged on the support member, the alignment tool including a plurality of apertures wherein the alignment tool includes multiple plates spaced from one another, each of the plates including an aperture of the plurality of apertures, the apertures aligned with one another;
an adjustment member associated with at least one of the tool and support member, the adjustment member configured to adjust a relative position of the tool and the support member to enable the laser beam to pass through the aperture and onto a target during an alignment procedure; and
a multiaxis robot supporting the tool and in communication with the adjustment member, the adjustment member adjusting the position of the tool in response to an input during the alignment procedure.

6. The machine alignment system according to claim 5, wherein the target is provided on one of the plates spaced from the apertures.

7. The machine alignment system according to claim 6, wherein the target includes a dimple aligned with the apertures.

8. The machine alignment system according to claim 5, comprising locating features arranged between the support member and the alignment tool for providing a desired orientation there between.

\* \* \* \* \*